United States Patent Office 3,504,529
Patented Apr. 7, 1970

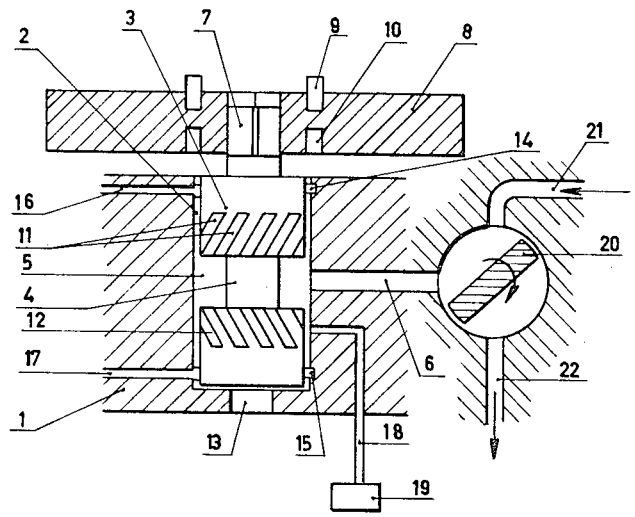
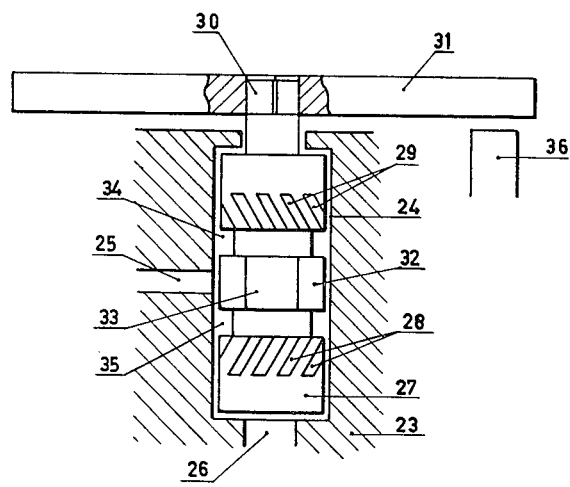

3,504,529
ELEMENT FOR HYDRAULICAL MEASURING, CONTROL AND CALCULATING DEVICES
Gilles Gerardus Hirs, Reeuwijk, Netherlands, assignor to Nederlandse Organisatie voor Toegepast-Natuurwetenschappelijk Onderzoek ten behoeve van Nijverheid Handel en Verkeer, The Hague, Netherlands
Filed July 14, 1967, Ser. No. 653,408
Claims priority, application Netherlands, July 15, 1966, 6609965
Int. Cl. G01n 17/14
U.S. Cl. 73—54          3 Claims

ABSTRACT OF THE DISCLOSURE

An apparatus for hydraulical measuring, control and calculating systems consists of a stator on which a rotor is supported and driven by means of a helically grooved, pressure-fed fluid bearing. An intermittent fluid feed and an adapted moment of mass inertia of the rotor result in a variable rotation of the rotor, the average speed and the variations of the speed of rotation giving information on the pressure and the viscosity of the fluid at the same time.

---

The present invention relates to an element for hydraulical measuring, control and calculating devices, comprising a stator, a rotor, a cleft-shaped space between a surface of revolution of the stator and a corresponding surface of revolution of the rotor, at least part of one of the surfaces of revolution being provided with grooves positioned obliquely with respect to the relative direction of motion of the two surfaces, means for supplying a pressurized liquid to the cleft-shaped space and provisions for draining this liquid from the said space in such places that the grooved surface is positioned between a place of supply and a place of drainage, and means for measuring the state of motion of the rotor.

Such an element has already been proposed for the measuring of the viscosities and pressures of liquids.

As a matter of fact, when the rotor is allowed to rotate freely, it acquires a rotational speed which, at a certain pressure of the liquid supply, is inversely proportional to the viscosity of the liquid, so that the viscosity of a liquid can be determined with this element, by supplying the liquid to the element at a known pressure and determining the rotational speed of the rotor.

If, on the contrary, the rotor is prevented from rotating, then the rotor will exert a turning moment, which is proportional to the pressure of the liquid supply when the drainage of the liquid is free, so that the liquid pressure in a pipe which is connected to the element can be determined by measuring the moment exerted by the rotor.

It is an object of the invention to provide the element with auxiliary means which will give it a wider field of application.

For this purpose, the element according to the present invention has the characterizing feature that the rotor has been provided with means for giving the rotor a moment of mass inertia which is such that at the occurrence of pressure changes in the liquid supply, the changes of speed of the rotor will be shifted in phase with respect to the pressure changes by at least about 10°.

Generally, the moment of mass inertia of the rotor, if the above-mentioned means are absent, is so slight that the rotor may be regarded as being massless. Therefore, the means for the adjustment of the moment of mass inertia means an augmenting of it.

The adjustment of the moment of mass inertia of the rotor may for example be realized by placing on the rotor one or more disks from a series of disks having different dimensions. Another possibility is, to provide the rotor with two or more weights which are adjustable in radial direction and with which a continuous adjusting possibility of the moment of mass inertia is obtained.

The required value of the moment of mass inertia is determined, besides by the geometry and dimensions of the co-operating surfaces of the stator and the rotor, by the circumstances under which the element is used. It may be determined in an experimental way and in some cases it may be calculated in a simple manner.

The last-named case presents itself, when the co-operating surfaces of the stator and the rotor are cylindrical and the pressure changes periodically, in which case it is assumed that the pressure changes in a sinusoidal way according to the formula $p=p_0 \sin \omega t$. The moment of inertia may then be calculated from the formula:

$$tg\alpha = \frac{h_0 \cdot I \cdot \omega}{\eta \cdot r^3 \cdot l \cdot f}$$

in which:
$\alpha$=angle of phase shift,
$h_0$=radial clearance between stator and rotor,
$I$=moment of mass inertia of the rotor,
$\eta$=viscosity of the liquid,
$r$=radius of the cylinder surfaces,
$l$=length of the cylinder surfaces between liquid supply and drainage, and
$f$=function of the groove parameters, and in which it is a requirement that $10° < \alpha < 90°$, for example by assuming that $\sim 0.1 < tg\alpha < \sim 100$.

With such an element it is possible, for example, to average or to integrate a changing pressure. When the pressure changes are of a periodical nature, the average speed of the rotor indicates the average value of the pressure, while the acceleration or the amplitude of the periodical changes of speed of the rotor are a measure for the amplitude of the pressure changes.

In a preferred embodiment, the element according to the present invention has the further characterizing feature that an interrupter for alternately interrupting and letting through the flow of liquid in a periodical way has been incorporated in the liquid supply pipe leading to the cleft-shaped space.

By determining the maximum and minimum speed of the rotor of such an element, it is possible to measure the pressure and the viscosity of the liquid simultaneously and to have automatic control of a great variety of processes and hydraulic systems on the basis of the measuring results. As a matter of fact, the difference between the two velocities is a direct measure for the pressure, whilst the sum of the velocities is proportional to the quotient of the pressure and the viscostiy.

If the phase shift is not too close to the stated lower or upper limit, the instrument offers the additional possibility to come to a direct determination of the viscosity by measuring the said phase shift with the aid of the above-quoted formula.

The interrupter preferably comprises a revolving valve, which is driven by a motor. This motor can for example be an element of the type to which the present invention relates, which comprises a stator and a rotor. This opens up the possibility, to make the frequency of the changes of speed also dependent on a magnitude occuring in the process or in the system.

A simple embodiment of an element according to the invention is obtained, by deriving the rotation of the valve directly from the rotor of the element, preferably by constructing part of the rotor itself in the shape of a valve.

Instead of a pressurized liquid, a pressurized gas may be supplied to the element. In this case, same measurements are in principle possible. However, owing to the compressibility of gases the calculations are less simple than with liquids.

In the following, the invention will be further illustrated with reference to the accompanying drawing, in which:

FIG. 1 is a diagrammatical representation of an element according to this invention, and FIG. 2 is a diagrammatical representation of a variant of the said element.

The embodiment according to FIG. 1 comprises the case 1 with the cylindrical bore 2 and the rotor 3, which fits into the bore 2 with some clearance, the size of which has for clearness sake been exaggerated in the drawing.

The rotor 3 has a middle part 4 of smaller diameter and consequentially it forms, together with the bore 2, the annular space 5, into which the liquid supply channel 6 opens.

At its upper side, the rotor 3 is provided with a coaxial pin 7, which is partly square and on which the disk 8 is placed in a loose way. The moment of mass inertia of the rotor 3 may be changed and brought to the required value, by replacing the disk 8 by a similar disk of different dimensions or by placing a plurality of such disks simultaneously on the pin 7 by means of the pins 9 and the holes 10.

In the cylindrical surface of the rotor 3 are provided helical grooves 11 and 12, which have opposite pitch angles on either side of the part 4.

In the flat bottom of the bore 2 is provided the aperture 13, which forms a free drain for the liquid. Opposite the ungrooved parts of the rotor 3, the bore 2 is provided with the annular recesses 14 and 15, with which are connected the channels 16 and 17 respectively. The channel 18 opens into the bore 2 opposite the surface of the rotor 3 which is provided with grooves and is on the other side connected with an instrument 19 which counts or records hydraulic pulses. Instead of the instrument 19, any other method for measuring and recording the rotation of the rotor 3 may be used.

The liquid supply channel 6 is alternately connected to a hydraulic system under overpressure by the pipe 21 and to a free liquid drainage by the pipe 22, by means of the rotating valve 20. The rotation of the valve 20 may be derived from a rotating shaft or from a motor in an arbitrary manner.

The operation of the apparatus is as follows:

The liquid pressure in the pipe 21 and the operation of the rotating valve 20 bring about a pulsating overpressure in the channel 6 and in the space 5. Under the influence of this pulsating overpressure, the liquid from the space 5 streams out through the cleft which is present between the rotor 3 and the bore 2. The presence of the grooves 11 and 12 in the surface of the rotor 3 causes the latter to start rotating at a speed which is dependent on the pulsating pressure in the space 5, the viscosity of the liquid and the moment of mass inertia in the disk 8. This speed is measured by the instrument 19 with the aid of the pressure pulses, which are caused to arise in the pipe 18 by the passing of the grooves 12 along its mouth, so as to make the said instrument 19 provide information about the pressure and the viscosity of the liquid in the pipe 21.

When a liquid pressure also prevails in the channels 16 and 17, the state of motion of the rotor is determined by the combination of the pressures in the space 5 and in the recesses 14 and 15, so that it is possible to combine various data with each other, if so desired.

The embodiment of the invention according to FIG. 2 also comprises a case 23 having cylindrical bore 24, into which a liquid supply channel 25 opens laterally and a drainage channel 26 opens at the lower side, and into which a rotor 27 fits with a slight clearance. The rotor 27 is provided with helical grooves 28 and 29 and at its top it has a pin 30 on which a disk 31 is mounted.

In this embodiment of the element according to the invention, the rotor 27 is also provided with the rotating valve 32, which consists of a cylindrical part of the rotor which fits into the bore 24 with a slight clearance, the said cylindrical part being provided with two flat sides 33 and being situated opposite the mouth of the channel 25. The result hereof is that, when the rotor 27 is rotating, the channel 25 is alternately closed or connected to the spaces 34 and 35 which have been recessed into the rotor.

The operation of this element is mainly identical to that of the element according to FIG. 1. The measurement of the velocity of the rotor is effected by means of an optical instrument 36, with a view to which the disk 31 may be provided with alternate dark and light or reflecting surfaces or stripes.

What is claimed is:

1. An apparatus for hydraulical measuring, control and calculating devices comprising a stator having a bore, a rotor within said bore having a diameter only slightly smaller than the diameter of said bore and a middle part of decreased size forming a cleft-shaped space between a surface of revolution of said bore of said stator and a corresponding surface of revolution of said rotor, at least part of one of the surfaces of said rotor being provided with grooves positioned obliquely with respect to the relative direction of motion of the two surfaces, means for supplying a pressurized liquid to said cleft-shaped space perpendicular to the rotational movement of said rotor, means for draining said liquid from the said cleft-shaped space in such places that the grooved surface is positioned between a place of supply and a place of draining, and means for measuring the state of motion of said rotor, said rotor being provided with variable means for giving said rotor a moment of mass inertia which is such that at the occurrence of pressure changes in the liquid, the changes of speed of the rotor will be shifted in phase with respect to the pressure changes by at least about 10°.

2. An apparatus according to claim 1, wherein an interrupter for alternately interrupting and letting through the flow of liquid in a periodical way is incorporated in the liquid supply pipe leading to the cleft-shaped space.

3. An apparatus according to claim 2, wherein the interrupter is constructed as a revolving valve, which is connected with the rotor and which is incorporated in the supply circuit of the liquid to the cleft-shaped space.

References Cited

UNITED STATES PATENTS

| 3,093,973 | 6/1963 | Williams | 73—229 X |
| 3,329,021 | 7/1967 | Quesinberry et al. | 73—229 |

LOUIS R. PRINCE, Primary Examiner

J. W. ROSKOS, Assistant Examiner